(12) United States Patent
Grott

(10) Patent No.: US 7,866,916 B2
(45) Date of Patent: Jan. 11, 2011

(54) METHODS FOR DEICING ROADS

(75) Inventor: Gerald J. Grott, Phoenix, AZ (US)

(73) Assignee: Ecycling, LLC, Phoenix, AZ (US)

(*) Notice: Subject to any disclaimer, the term of this patent is extended or adjusted under 35 U.S.C. 154(b) by 689 days.

(21) Appl. No.: 11/980,005

(22) Filed: Oct. 30, 2007

(65) Prior Publication Data

US 2008/0063474 A1 Mar. 13, 2008

Related U.S. Application Data

(63) Continuation-in-part of application No. 10/706,341, filed on Nov. 11, 2003, now Pat. No. 7,353,634, which is a continuation-in-part of application No. 09/849,453, filed on May 4, 2001, now Pat. No. 6,651,383, which is a continuation-in-part of application No. 09/565,735, filed on May 5, 2000, now Pat. No. 6,374,539, which is a continuation-in-part of application No. 09/110,789, filed on Jul. 6, 1998, now Pat. No. 6,071,411.

(51) Int. Cl.
*E01C 11/24* (2006.01)

(52) U.S. Cl. ...................................... 404/75

(58) Field of Classification Search .............. 404/72, 404/75; 106/13; 252/70; 244/134 R
See application file for complete search history.

(56) References Cited

U.S. PATENT DOCUMENTS

| | | | | | |
|---|---|---|---|---|---|
| 3,456,368 | A | * | 7/1969 | Jacques | 37/228 |
| 3,928,654 | A | * | 12/1975 | Bonnanzio | 427/8 |
| 5,039,439 | A | * | 8/1991 | Hansman et al. | 252/70 |
| 5,472,291 | A | * | 12/1995 | Vogel | 404/72 |
| 5,853,262 | A | * | 12/1998 | Vogel | 404/71 |
| 6,156,226 | A | * | 12/2000 | Klyosov et al. | 252/70 |

* cited by examiner

*Primary Examiner*—T. Nguyen
(74) *Attorney, Agent, or Firm*—Barbara J. Luther; The Luther Law Firm, PLC

(57) ABSTRACT

Roadways are deiced or ice formation on roadways is prevented by applying salt compositions derived from waste water streams from water softening operations.

3 Claims, 4 Drawing Sheets

METHODS FOR DEICING ROADS

RELATED APPLICATIONS

This application is a continuation-in-part of my application U.S. Ser. No. 10/706,341 filed Nov. 1, 2003 now U.S. Pat. No. 7,353,634, which is, in turn, a continuation-in-part of my application U.S. Ser. No. 09/849,453, filed May 4, 2001, now U.S. Pat. No. 6,651,383 issued Nov. 25, 2003, which is, in turn, a continuation-in-part of my application U.S. Ser. No. 09/565,735 filed May 5, 2000, now U.S. Pat. No. 6,374,539 issued Apr. 23, 2002, which is, in turn, a continuation-in-part of my application U.S. Ser. No. 09/110,789 filed Jul. 6, 1998, now U.S. Pat. No. 6,071,411 issued Jun. 6, 2000.

BACKGROUND OF THE INVENTION

The present invention relates to methods for deicing roads.

Water purification typically produces a first effluent of relatively "clean water" and a second effluent of "waste water" which includes unwanted contaminates. The softening of hard water by the removal of calcium and magnesium is required for both industrial and household use.

Known water softening processes proceed either by way of ion-exchange, membrane softening or precipitation. In the ion-exchange processes, the calcium ($Ca^{++}$) and magnesium ($Mg^{++}$) ions are exchanged for sodium ($Na^+$) and regeneration of the ion-exchange resin is achieved with a large excess of NaCl. This process creates a regeneration effluent that is relatively concentrated aqueous solution of sodium, calcium and magnesium chlorides which has to be discarded.

Alternatively, it is possible to use weak acid resins which exchange hydrogen ($H^+$) for calcium ($Ca^{++}$) and magnesium ($Mg^{++}$), and to regenerate the spent resins with a mineral acid. While this method creates less waste water, it is more expensive and yields relatively acidic soft water which is corrosive. Meanwhile, membrane softening concentrates the calcium, magnesium salts and salts of other divalent ions to produce waste waters which require costly disposal techniques.

The precipitation process has traditionally been carried out by the "lime soda" process in which lime is added to hard water to convert water soluble calcium bicarbonate into water insoluble calcium carbonate. This anti-erosion agent process also results in waste water which is difficult to filter.

My previously issued patent, U.S. Pat. No. 5,300,123 (which is incorporated herein by reference), relates to the purification of impure solid salts. Even this process produces salty waste water which must be disposed of.

The disposal of waste water has become an expensive problem for society. For example, approximately 1.61 billion gallons of waste water containing approximately 800,000 tons of mixed sodium, calcium, magnesium chlorides and sulfates is produced from water treatment operations and oil fields in the state of California alone. This waste water must be disposed of, costing the state of California millions of dollars each year. Meanwhile, the disposal of waste water has become even more problematic in other parts of the world.

Accordingly, it would be highly advantageous to provide improved methods deicing roads by use of salty waste waters.

Ironically, though there is an overabundance of waste waters that are contaminated with the salts of Na, K, Ca, Mg, Fe, Cl, SO4, and/or CO3 that, as discussed above, is extraordinarily expensive to dispose of, millions of dollars are spent each year on salts such as sodium chloride for deicing highways. It would thus be advantageous if the salts in waste water could be used for deicing highways.

SUMMARY OF THE INVENTION

Briefly, in accordance with the invention, I provide methods for economically deicing or preventing icing of roadways, using waste waters, particularly those produced from oil and gas wells, and irrigation drainage. These waste waters are processed to create both solid and aqueous mixtures of salts which are applied to roads and highways for deicing and for reducing the tendency of water to form into ice on roads and highways.

Thus, according to my method for deicing or preventing icing of roadways, comprises, in combination, the steps of collecting water contaminated with the 0.15% or more by weight of the salts of Na, Ca, Mg, Cl, SO4, or CO3 or combinations thereof, processing the contaminated water to produce a first effluent of clean water and a second effluent of waste water and applying the waste water to roadways.

According to another embodiment of the invention, my methods include the further step of concentrating the solid salts in the waste water by solar evaporation before applying the concentrate to roadways.

In still another embodiment of the invention, the salts in the waste water are separated therefrom by solar evaporation and the solid separated salts are applied to roadways.

The waste waters of the present invention are any waters which are produced as a result of the purification of water, and particularly purified "oil field produced waters" and irrigation drainage, which results in a first effluent of clean water and a second effluent of a waste water. As defined herein, clean water refers to water which has been treated by one or several methods for public or industrial use. For example, in the drinking water industry, clean water is the final delivered water. Typical water purification processes and water softening processes of the present invention include reverse osmosis, electro dialysis, distillation, evaporation, ion exchange and lime softening. These processes create waste water having various levels of salt content. For the purposes of this invention, I define "waste water" as water containing about 0.15% or more by weight of the salts of Na, K, Ca, Mg, Fe, Cl, SO4, and CO3 or a combination thereof.

Accordingly, it is an object of the invention to provide cost effective means of disposing of waste water produced from the purification of water. To this end, it is a principal object of the invention to provide new methods for utilizing waste water produced from water purification.

The principal object of the present invention to provide methods for producing solid and liquid mixtures for deicing roads and highways, using waste waters as the starting material.

These and other, further and more specific objects and advantages of the invention will be apparent to those skilled in the art from the following detailed description taken in conjunction with the drawings.

DETAILED DESCRIPTION OF THE PREFERRED EMBODIMENTS

Figure 1:
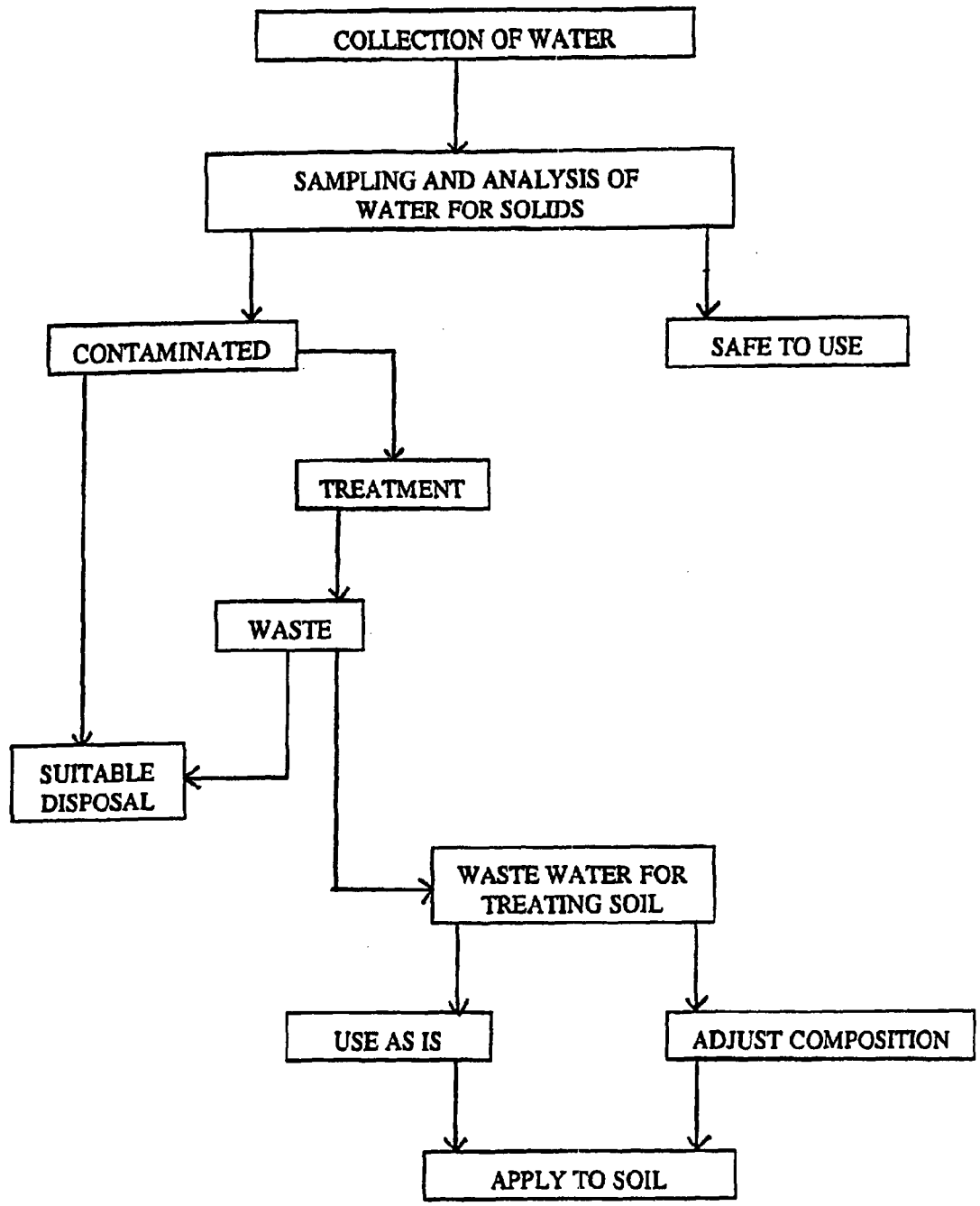
FIG. 1 is a flow chart of the preferred method of the invention.

While the present invention is susceptible of embodiment in various forms, as shown in the drawings, hereinafter will be described the presently preferred embodiments of the invention with the understanding that the present disclosure is to be considered as an exemplification of the invention and it is not intended to limit the invention except as indicated in the claims.

Water softening is the removal of the "hardness" from the water which means predominantly removing or altering the calcium and magnesium ions from the water. These calcium and magnesium ions combine with carbonates, sulfates, oils and fat to create bathtub scum, spotted dishes, gray sheets, etc. In addition, unsoftened water has been found to cause scaling of industrial water heaters and commercial boilers causing early substantial energy losses through impaired heat transfer and early shutdown for the removal of scale. Several methods for effecting water softening are known. The best known process for softening water is "ion-exchange." Ion-exchange entails the exchange of sodium, which is introduced into water, for calcium, magnesium, iron and other divalent mineral ions which are transferred out of the water and into a resin. When the resin approaches saturation with these hard ions, the resin is regenerated most often with solutions of sodium chloride leaving an effluent containing 3 to 25% sodium, calcium and magnesium salts which must be disposed of. The exact concentration of the effluent depends on the shop practice and, in particular, on the amount of rinse water included in the effluent, if any. Less often, mineral acids like sulfuric acid or hydrochloric acid are used for water softening and these also produce effluents. Conversely, reverse water softening also involves ion exchange in which calcium and magnesium are introduced into the water to separate sodium.

Membrane systems have recently become economically feasible. These systems, such as electro dialysis and reverse osmosis, include the use of a membrane which also produces a salty effluent. For critical uses such as electronics, and particularly for use in the manufacture of computer chips, the first product of clean water may be further purified by dual bed or mixed bed ion-exchange treatment. This "polishing treatment" also produces an effluent containing the removed salts.

Each of these water purifying processes produce a clean water effluent and a waste water effluent which is expensive and difficult to dispose of. Moreover, in U.S. Pat. No. 5,300,123, I disclose a method for reducing the soluble and insoluble impurity levels in salt. In the practice of the invention of the '123 patent, salt crystals are initially reduced in size by fine grinding the crystal mass. The crystal mass is then added to a substantially saturated solution of salt and the strain induced in fine grinding process causes them to dissolve in the substantially saturated solution to the extent that the solution becomes supersaturated and new purified crystals form and grow. This dissolving and reforming is continued until substantially all of the original finely ground particles of salt have dissolved and reformed as new purified crystals. The new purified crystals are separated by size from the solution and rinsed, while the fine insoluble impurities which do not grow appreciably, if at all, remain in the now impure solution of sodium, calcium and magnesium chlorides, along with minor impurities from the original waste salt.

For the purposes of this invention, "waste water" is defined as any water containing sufficient salts as to have no acceptable use due to costs or contamination levels. In general, waste water containing about 0.15% or more by weight of the salts of Na, K, Ca, Mg, Fe, Cl, SO4, and CO31 or combinations thereof are considered as having no acceptable use and must be disposed of.

With reference to FIG. 1, in a preferred embodiment, water is collected which is contaminated with salts including Na, K, Ca, Mg, Fe, Cl, SO4 and CO3. The contaminated water is purified by any means known to those skilled in the art, including distillation, reverse osmosis, electrolysis, evaporation, ion exchange, etc. The contaminated water is processed to produce a first effluent of relatively clean water which is useful for agricultural purposes, drinking water, industrial purposes, etc. The processing also produces a second effluent of waste water. The waste water is analyzed for hazardous materials to confirm that the waste water is safe to use. Thereafter, the waste water, comprising an aqueous solution of salts, is analyzed for individual amounts of sodium, calcium, and magnesium and total dissolved solids to determine the best application.

Figure 2:
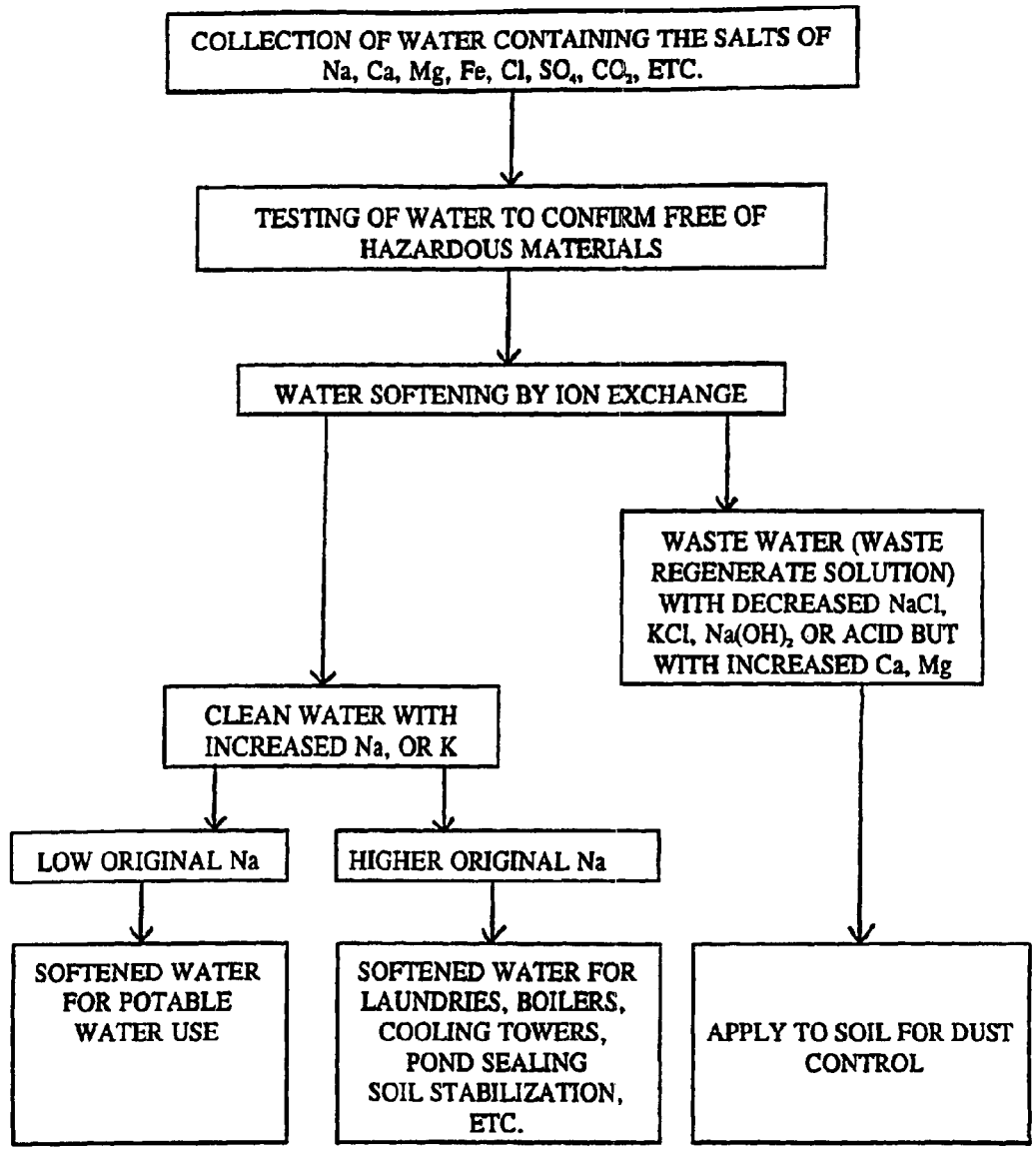
FIG. 2 is a flow chart of another preferred method of the invention.

With reference to FIG. 2, in a second preferred embodiment, water is collected which is contaminated with the salts of Na, Ca, Mg, Fe, Cl, SO4, and CO3. The water is then tested to confirm that it is free of hazardous materials. The contaminated water is then purified by ion exchange. As the name implies, the amount of salts in the effluents does not change. However, the cations are exchanged. By this process, a first effluent of clean water is produced having an increase in sodium or potassium and a waste water having decreased NaCl, KCl, Na(OH)2 or acid, but having increased calcium and magnesium.

Figure 3:
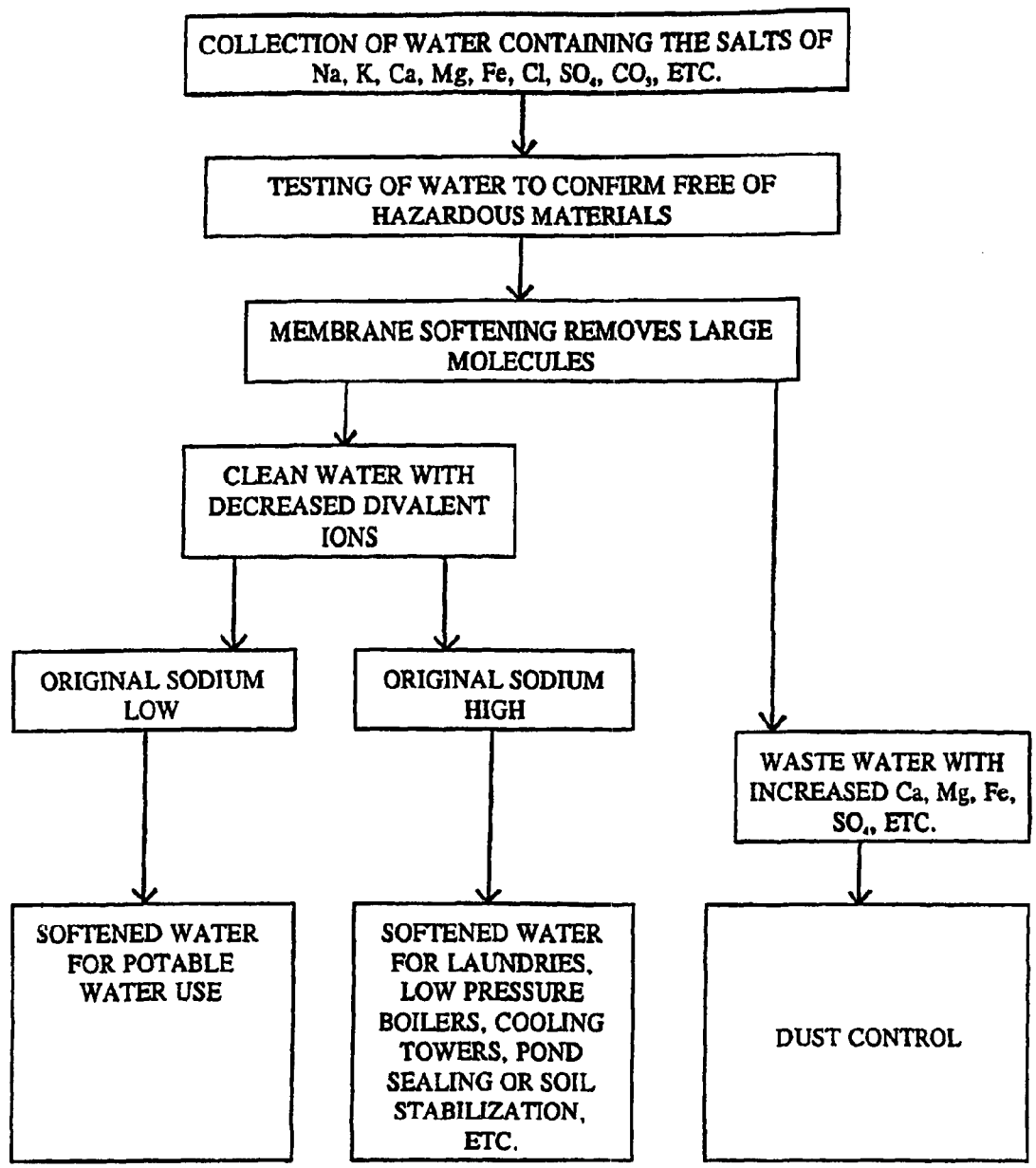
FIG. 3 is a flow chart of still another preferred method of the invention.

With reference to FIG. 3, in a fourth preferred embodiment, water is collected which is contaminated with the salts of Na, K, Ca, Mg, Fe, Cl, SO4, and CO3. The water is then tested to confirm that it is free of hazardous materials. This contaminated water is then purified by a membrane system to remove large molecules. A first effluent of clean water having decreased multivalent ions is produced from the membrane softening process. Where the original sodium content of the contaminated water is relatively low, it is preferred that the clean water be used for potable water. Where the original sodium content of the contaminated water is relatively high, it is preferred that the clean water effluent be used for laundries, low pressure boilers, cooling towers, pond sealing and soil stabilization. The membrane system also creates a waste water having significant calcium, magnesium, iron, sulfates, etc. For application of the present invention, it is preferred that this waste water processed to yield products which can be used for roadway deicing or icing prevention.

Figure 4:
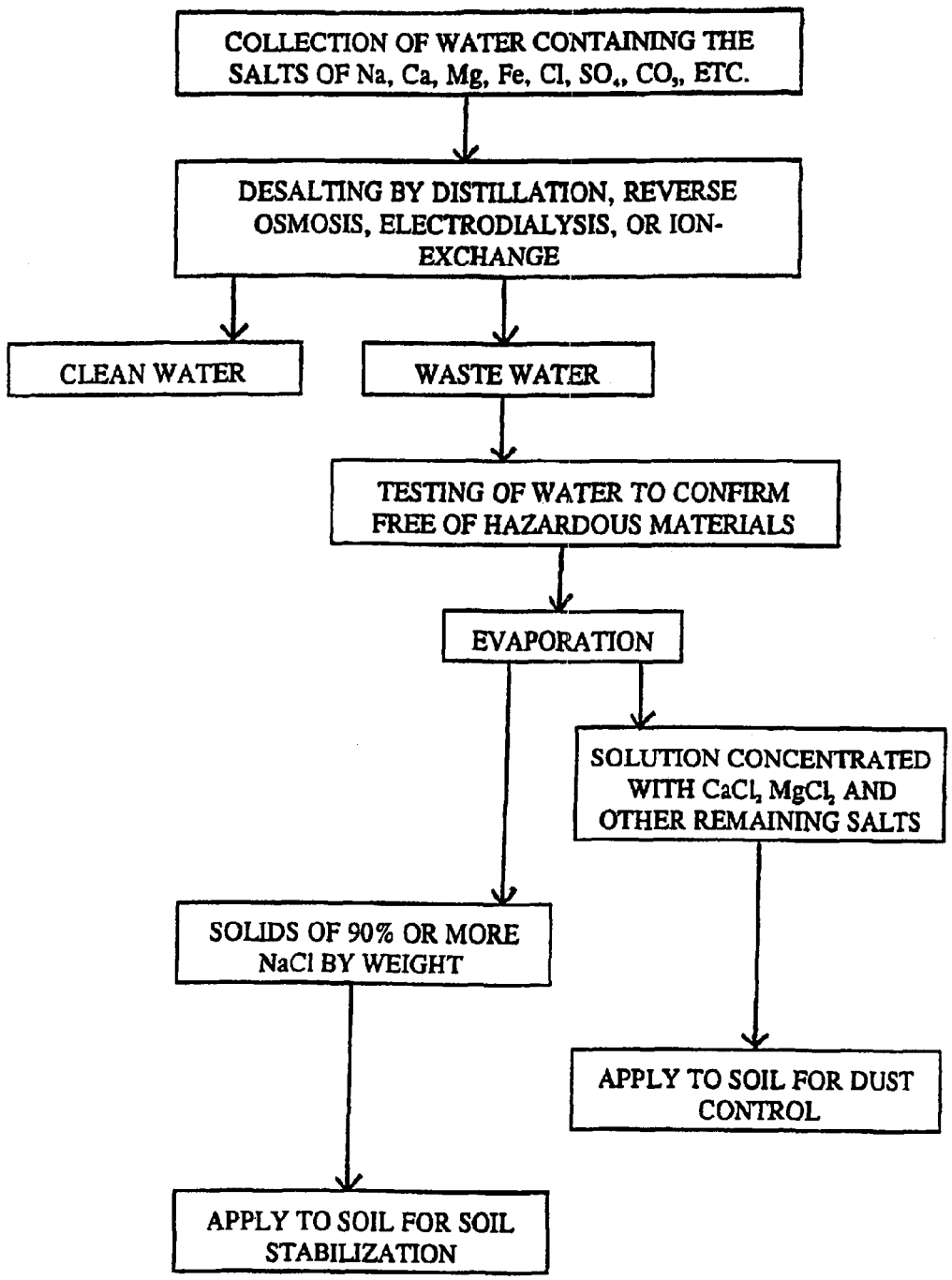
FIG. 4 is a flow chart of a preferred method of the present invention including evaporation to produce substantially solid sodium chloride.

As shown in FIG. 4, in a fourth embodiment of my invention, water contaminated with the salts of Na, K, Ca, Mg, Fe, Cl, SO4, and CO3 is collected. The contaminated water is desalted to produce a first effluent of relatively clean water, and a second effluent of waste water. The second effluent of waste water undergoes further evaporization processing to produce a first product of 90% or more NaCl, and a third effluent solution of substantially saturated CaCl2 and MgCl. For practice of the invention, the NaCl is then used by application to a roadway to prevent icing or to rid the roadway of ice already formed. Alternatively, the second effluent waste water liquid can be applied directly to roadways by spraying to prevent or rid the roadway of ice.

Moreover, I have found that the waste water can be processed through evaporation, or in accordance with the methods disclosed in my U.S. Pat. No. 5,300,123, to produce substantially solid sodium salt which can be applied to roads to lower the freezing point of water on the roads. In addition, even though the calcium and magnesium solution is typically aqueous, it can also be applied to roads and highways to inhibit the formation of ice on the roads as calcium and magnesium salts also lower the freezing point of water. Thus, any water previously on the road will freeze at a lower temperature once mixed with the calcium and magnesium solution which has been produced as a result of evaporating the waste water.

EXAMPLE

Tests were run so as to duplicate, on a reduced scale, the typical solar evaporation practice with two or more evaporation stages, in series, to get best evaporation efficiency. Evaporation was carried out in duplicate pans 33 cm×63 cm×10 cm deep, lined with polyethylene film. Daily ambient highs were 38-42° C. and night lows were 15° to 17° C. less. Daytime relative humidity was 15 to 25%. The specific gravity (sg) of the Salton Sea water was 1.03.

On the second day of evaporation (sg 1.047) white flakes were forming with many floating on the brine surface. By morning of the third day, at (sg 1.057), the flakes formed an almost continuous covering. The evaporation rate varied between 0.9 and 1.2 centimeters per day until the specific gravity was at 1.145 and the floating crystals, now including other salts, formed a thick continuous (surface) skin. After a continuous skin formed on the surface the brine temperatures were as high as 48 C.

Evaporation was continued to sg 1.22 and sodium chloride was observed. A sample of the crystallized salt was taken from the pan from which much of the calcium solids had been removed for the first analysis. With even this minimum of preparation, this salt met the specifications of most states for deicing salts.

A second run using the same evaporation pans and a similar procedure was made in late September as the nights started to cool. Analysis of the recovered salts followed the pattern of the first tests. All salt samples contained more than 90% sodium chloride without washing or separation of windblown dirt and dust. These samples are suitable for use in road deicing.

Having described the invention in such terms as to enable one skilled in the art to make and use it and having identified the presently preferred embodiments thereof, I claim:

1. A method for deicing or preventing icing of roadways, comprising, in combination, the steps of:
    collecting water contaminated with the 0.15% or more by weight of the salts of Na, Ca, Mg, Cl, SO4, or CO3 or combinations thereof;
    processing the contaminated water to produce a first effluent of clean water and a second effluent of waste water;
    applying said waste water to roadways.

2. The method of claim 1 which includes the further step of:
    concentrating the solid salts in said waste water by solar evaporation before applying the concentrate to roadways.

3. The method of claim 1, in which the salts in said waster water are separated therefrom by solar evaporation and the solid separated salts are applied to roadways.

\* \* \* \* \*